US012084040B2

(12) United States Patent
Ohta

(10) Patent No.: US 12,084,040 B2
(45) Date of Patent: Sep. 10, 2024

(54) CONTROL DEVICE FOR VEHICLE

(71) Applicant: HONDA MOTOR CO., LTD., Tokyo (JP)

(72) Inventor: Takashi Ohta, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 337 days.

(21) Appl. No.: 17/673,835

(22) Filed: Feb. 17, 2022

(65) Prior Publication Data

US 2022/0314959 A1  Oct. 6, 2022

(30) Foreign Application Priority Data

Mar. 31, 2021  (JP) .................................. 2021-060829

(51) Int. Cl.
*B60W 20/12* (2016.01)
*B60K 6/442* (2007.10)
(Continued)

(52) U.S. Cl.
CPC ............. *B60W 20/12* (2016.01); *B60K 6/442* (2013.01); *B60W 20/13* (2016.01); *B60W 20/20* (2013.01);
(Continued)

(58) Field of Classification Search
CPC ...... B60W 20/12; B60W 20/13; B60W 20/20; B60W 2510/244; B60K 6/442; G07C 5/02; B60Y 2200/92
See application file for complete search history.

(56) References Cited

U.S. PATENT DOCUMENTS 9,969,288 B2 *  5/2018  Ikeda ...................... B60L 53/14
10,643,272 B2 *  5/2020  Takatsuka ............. H01M 10/42
(Continued)

FOREIGN PATENT DOCUMENTS

JP   2010-026759   2/2010
JP      4438812    3/2010
(Continued)

OTHER PUBLICATIONS

Japanese Office Action for Japanese Patent Application No. 2021-060829 mailed Nov. 1, 2022.

*Primary Examiner* — Gertrude Arthur Jeanglaude
(74) *Attorney, Agent, or Firm* — Amin, Turocy & Watson, LLP

(57) ABSTRACT

A control device for a vehicle is a control device provided on a vehicle which includes a positional information acquisition part configured to acquire positional information of the vehicle and a turning amount acquisition part configured to acquire a turning amount of the vehicle, the control device for a vehicle including a starting point specifying part configured to specify a departure place of the vehicle on the basis of the positional information, a measurement starting point setting part configured to set a measurement starting point of a turning amount of the vehicle on the basis of the positional information, a traveling route recording part configured to record the measurement starting point and the turning amount of the vehicle, and a scheduled route estimating part configured to estimate a scheduled traveling route of the vehicle on the basis of the recorded measurement starting point and the recorded turning amount.

6 Claims, 13 Drawing Sheets

(51) Int. Cl.
*B60W 20/13* (2016.01)
*B60W 20/20* (2016.01)
*G07C 5/02* (2006.01)

(52) U.S. Cl.
CPC ......... *G07C 5/02* (2013.01); *B60W 2510/244* (2013.01); *B60Y 2200/92* (2013.01)

(56) References Cited

U.S. PATENT DOCUMENTS

| | | | | |
|---|---|---|---|---|
| 2005/0228553 | A1* | 10/2005 | Tryon | B60L 50/16 |
| | | | | 701/22 |
| 2011/0032110 | A1* | 2/2011 | Taguchi | B60L 3/12 |
| | | | | 340/636.1 |
| 2016/0061613 | A1* | 3/2016 | Jung | G01C 21/3632 |
| | | | | 701/538 |

FOREIGN PATENT DOCUMENTS

| | | |
|---|---|---|
| JP | 2017-033542 | 2/2017 |
| JP | 6674637 | 4/2020 |

\* cited by examiner

| MESH NO. | MEASUREMENT STARTING POINT | RIGHTWARD TURNING AMOUNT | LEFTWARD TURNING AMOUNT |
|---|---|---|---|
| (1) | X1, Y1 | 93 | 82 |
| (2) | X2, Y2 | 13 | 0 |
| (3) | X3, Y3 | 3 | 0 |
| (4) | X4, Y4 | 22 | 34 |
| (5) | X5, Y5 | 82 | 42 |
| (6) | X6, Y7 | 0 | 54 |
| (7) | X8, Y9 | 172 | 56 |

| MESH NO. | MEASUREMENT STARTING POINT | RIGHTWARD TURNING AMOUNT | LEFTWARD TURNING AMOUNT |
|---|---|---|---|
| (1) | X1, Y1 | 93 | 82 |
| (2) | X2, Y2 | 13 | 0 |
| (3) | X3, Y3 | 3 | 0 |
| (4) | X4, Y4 | 22 | 34 |
| (5) | X5, Y5 | 82 | 42 |
| (6) | X6, Y7 | 0 | 54 |
| (7) | X8, Y9 | 172 | 56 |

| MESH NO. | MEASUREMENT STARTING POINT | RIGHTWARD TURNING AMOUNT | LEFTWARD TURNING AMOUNT | EVENT OCCURRENCE | EVENT OCCURRENCE POINT |
|---|---|---|---|---|---|
| (1) | X1, Y1 | 93 | 82 | NONE | |
| (2) | X2, Y2 | 13 | 0 | NONE | |
| (3) | X3, Y3 | 3 | 0 | NONE | |
| (4) | X4, Y4 | 22 | 34 | NONE | |
| (5) | X5, Y5 | 82 | 42 | NONE | |
| (6) | X6, Y7 | 0 | 54 | NONE | |
| (7) | X8, Y9 | 172 | 56 | EXIST | X1, Y1 |

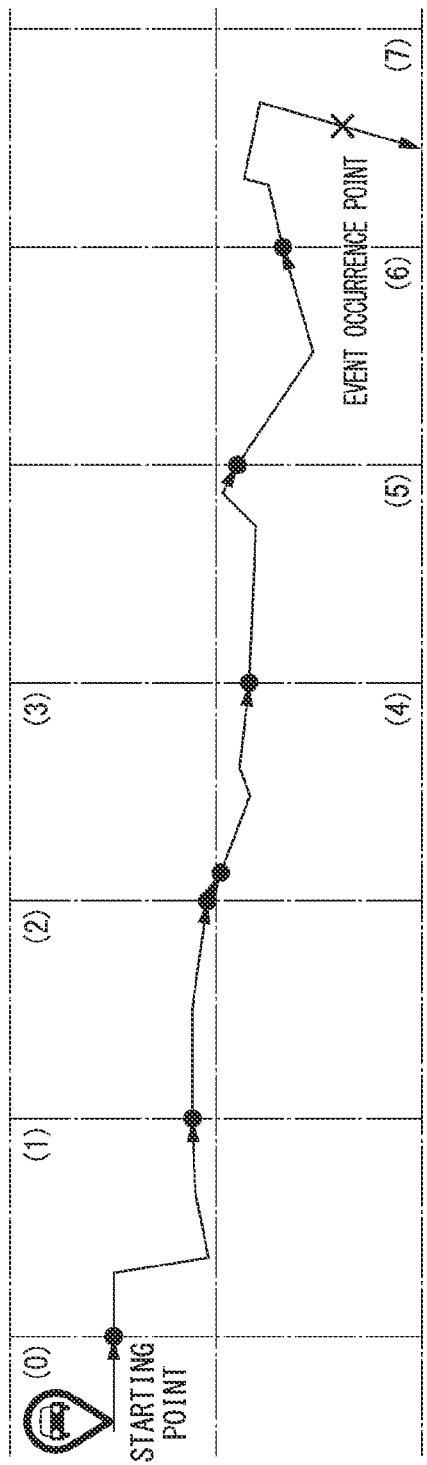

CONTROL DEVICE FOR VEHICLE

CROSS-REFERENCE TO RELATED APPLICATION

Priority is claimed on Japanese Patent Application No. 2021-060829, filed Mar. 31, 2021, the content of which is incorporated herein by reference.

BACKGROUND OF THE INVENTION

Field of the Invention

The present invention relates to a control device for a vehicle.

Description of Related Art

A technology of controlling an electrical storage device or the like mounted in a hybrid vehicle on the basis of information related to the hybrid vehicle is known. For example, Japanese Patent No. 4438812 discloses a technology in which, when a traveling route is not set, a destination and reliability of the destination are calculated on the basis of a traveling history, and a hybrid vehicle is controlled when the reliability is a predetermined value or more. In addition, Japanese Patent No. 6674637 discloses a technology of storing a point with a high segregation risk of a battery, and controlling a hybrid vehicle in a segregation restraint mode of the battery when having approached to within a range of a predetermined distance from such point.

SUMMARY OF THE INVENTION

However, the invention disclosed in Japanese Patent No. 4438812 has a defect that map data is essential. In addition, the invention disclosed in Japanese Patent No. 6674637 has a defect that a probability of whether a vehicle passes that point cannot be estimated because only distance information related to the point is used.

An aspect of the present invention is directed to providing a method of estimating a scheduled traveling route of a vehicle without using map information.

A control device for a vehicle according to the present invention employs the following configurations.

(1) A vehicle according to an aspect of the present invention includes a positional information acquisition part configured to acquire positional information of the vehicle, and a turning amount acquisition part configured to acquire a turning amount of the vehicle. A control device provided in the vehicle includes a starting point specifying part configured to specify a departure place of the vehicle on the basis of the positional information, a measurement starting point setting part configured to set a measurement starting point of a turning amount of the vehicle on the basis of the positional information, a traveling route recording part configured to record the measurement starting point and the turning amount of the vehicle, and a scheduled route estimating part configured to estimate a scheduled traveling route of the vehicle on the basis of the recorded measurement starting point and the recorded turning amount.

(2) In the aspect of the above-mentioned (1), the control device further includes a vehicle trajectory estimating part configured to estimate a trajectory of the vehicle on a two-dimensional plane on the basis of the positional information acquired from the positional information acquisition part, and the measurement starting point setting part sets an intersection between a reference line and the trajectory as the measurement starting point when the reference line provided on the two-dimensional plane in a lattice shape intersects the trajectory.

(3) In the aspect of the above-mentioned (1) or (2), the turning amount acquisition part acquires the turning amount by dividing the turning amount into a rightward turning amount and a leftward turning amount.

(4) In the aspect of the above-mentioned (1) or (2), the vehicle includes an engine, a battery, and an electric motor connected to a driving wheel, driven by electric power supplied from the battery, and configured to supply regenerative electric power generated upon regeneration to the battery, and an event occurrence recording part configured to record a position of the vehicle when an event related to the battery has occurred is provided.

(5) In the aspect of the above-mentioned (4), the event includes an event that a remaining capacity of the battery exceeds a predetermined value.

(6) In the aspect of the above-mentioned (4) or (5), the event includes an event that the vehicle is shifted to an electric power traveling mode which drives the vehicle by electric power supply from the battery without using the engine.

According to the aspects of the above-mentioned (1) to (3), it is possible to estimate the scheduled traveling route without using map data.

According to the aspects of the above-mentioned (4) to (6), it is possible to estimate the scheduled traveling route and control a hybrid vehicle without using map data.

BRIEF DESCRIPTION OF THE DRAWINGS

FIG. 7B is a view schematically expressing a traveling route recorded in the traveling route storage according to the second embodiment.

DETAILED DESCRIPTION OF THE INVENTION

Hereinafter, an embodiment of a control device of the present invention will be described with reference to the accompanying drawings.

[Entire Configuration]

Figure 1:
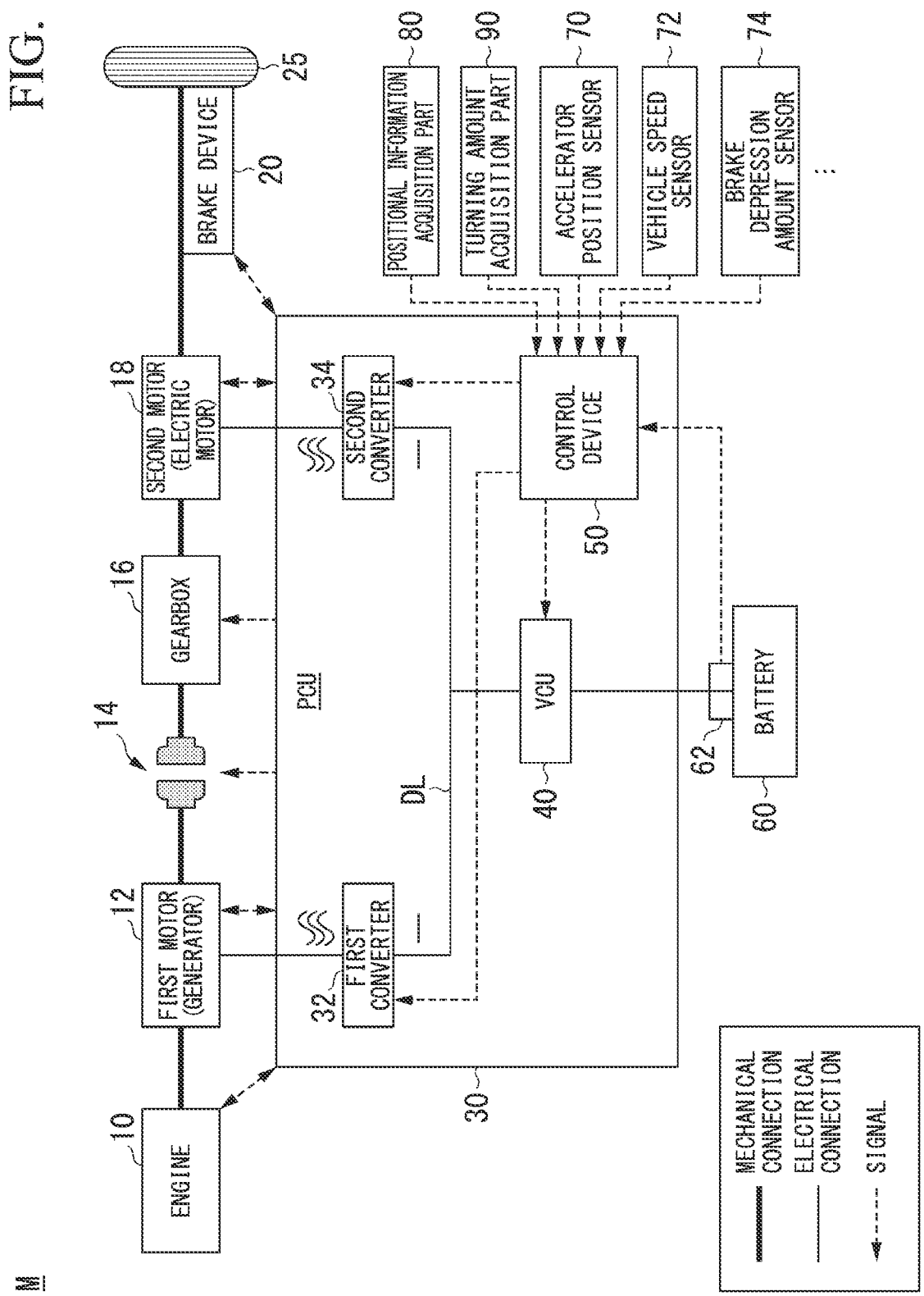
FIG. 1 is a view showing an example of a configuration of a vehicle of a first embodiment.

FIG. 1 is a view showing an example of a configuration of a vehicle M of a first embodiment. The vehicle M of the configuration shown is a hybrid vehicle that can switch between a series system and a parallel system. The series system is a system in which an engine and a driving wheel are not mechanically connected, dynamic power of the engine is only used for electric power generation by electric generator, and generated electric power is supplied to an electric motor for traveling. The parallel system is a system in which an engine and a driving wheel can be mechanically connected (or via a fluid in a torque converter or the like), and dynamic power of the engine can be transmitted to the driving wheel or used for electric power generation. The vehicle M of the configuration shown in FIG. 1 can switch between the series system and the parallel system by connecting or disconnecting a lock-up clutch 14.

As shown in FIG. 1, for example, an engine 10, a first motor (an electric generator) 12, the lock-up clutch 14, a gearbox 16, a second motor (an electric motor) 18, a brake device 20, a driving wheel 25, a power control unit (PCU) 30, a battery 60, a battery sensor 62 such as a voltage sensor, a current sensor, a temperature sensor, or the like, a vehicle sensor such as an accelerator position sensor 70, a vehicle speed sensor 72, a brake depression amount sensor 74, or the like, a positional information acquisition part 80, and a turning amount acquisition part 90 are mounted in the vehicle M. The vehicle M includes at least the engine 10, the second motor 18, and the battery 60, as driving sources.

The engine 10 is an internal combustion engine configured to output dynamic power by combusting fuel such as gasoline or the like. The engine 10 is, for example, a reciprocating engine including a combustion chamber, a cylinder, a piston, an intake valve, an exhaust valve, a fuel injection device, an ignition plug, a connecting rod, a crankshaft, and the like. In addition, the engine 10 may be a rotary engine.

The first motor 12 is, for example, a three-phase current generator. The first motor 12 has a rotor connected to an output shaft (for example, a crankshaft) of the engine 10, and generates electric power using dynamic power output by the engine 10. The output shaft of the engine 10 and the rotor of the first motor 12 are connected to the side of the driving wheel 25 via the lock-up clutch 14.

The lock-up clutch 14 switches between a state in which the output shaft of the engine 10 and the rotor of the first motor 12 are connected to the side of the driving wheel 25 and a state in which they are separated from the side of the driving wheel 25 according to the instruction from the PCU 30.

The gearbox 16 is a transmission. The gearbox 16 shifts the dynamic power output by the engine 10 and transmits the dynamic power to the side of the driving wheel 25. A transmission gear ratio of the gearbox 16 is designated by the PCU 30.

The second motor 18 is, for example, a three-phase current electric motor. A rotor of the second motor 18 is connected to the driving wheel 25. The second motor 18 outputs the dynamic power to the driving wheel 25 using the supplied electric power. In addition, the second motor 18 generates electric power using kinetic energy of the vehicle M upon deceleration of the vehicle M, and stores the generated electric power in the battery 60 via a second converter 34 and a VCU 40, which will be described below.

The brake device 20 includes, for example, a brake caliper, a cylinder configured to transmit a hydraulic pressure to the brake caliper, and an electric motor configured to generate a hydraulic pressure in the cylinder. The brake device 20 may include a mechanism configured to transmit a hydraulic pressure generated by an operation of the brake pedal to the cylinder via the master cylinder as a backup. Further, the brake device 20 is not limited to the above-mentioned configuration, and may be an electronically controlled hydraulic brake device configured to transmit a hydraulic pressure of a master cylinder to a cylinder.

The PCU 30 includes, for example, a first converter 32, the second converter 34, the voltage control unit (VCU) 40, and a control device 50. Further, it is only an example that these components are configured as the PCU 30 as a group, and these components may be arranged in a distributed manner.

The first converter 32 and the second converter 34 are, for example, AC-DC converters. Direct current-side terminals of the first converter 32 and the second converter 34 are connected to a direct current link DL. The battery 60 is connected to the direct current link DL via the VCU 40. The first converter 32 converts alternating current generated by the first motor 12 into direct current to output the direct current to the direct current link DL, or converts the direct current supplied via the direct current link DL into alternating current to supply the alternating current to the first motor 12. Similarly, the second converter 34 converts the alternating current generated by the second motor 18 into direct current to output the direct current to the direct current link DL, or converts the direct current supplied via the direct current link DL into alternating current to supply the alternating current to the second motor 18.

The VCU 40 is, for example, a DC-DC converter. The VCU 40 boosts the electric power supplied from the battery 60 to output the electric power to the DC link DL.

Functions of the control device 50 will be described below. The battery 60 is, for example, a secondary battery such as a lithium ion battery or the like.

The accelerator position sensor 70 is attached to an accelerator pedal that is an example of an operator configured to receive an acceleration instruction by a driver, detects an operation amount of the accelerator pedal, and outputs the operation amount to the control device 50 as an accelerator position. The vehicle speed sensor 72 includes, for example, wheel speed sensors and speed calculators attached to the wheels, integrates wheel speeds detected by the wheel speed sensors to derive a speed of the vehicle M (vehicle speed), and outputs the derived speed to the control device 50. The brake depression amount sensor 74 is attached to a brake pedal that is an example of an operator configured to receive a deceleration or stop instruction by a driver, detects an operation amount of the brake pedal, and outputs the operation amount to the control device 50 as a brake depression amount.

The positional information acquisition part 80 acquires positional information of the vehicle M. The positional information acquisition part 80 can be realized by using, for example, a global positioning system (GPS). The turning amount acquisition part 90 acquires a turning amount of the vehicle M. The turning amount is, for example, a value obtained by summing angles at which the vehicle M turns. The turning amount acquisition part can be realized using, for example, a yaw rate sensor.

First Embodiment

[Configuration of Control Device 50]

Figure 2:
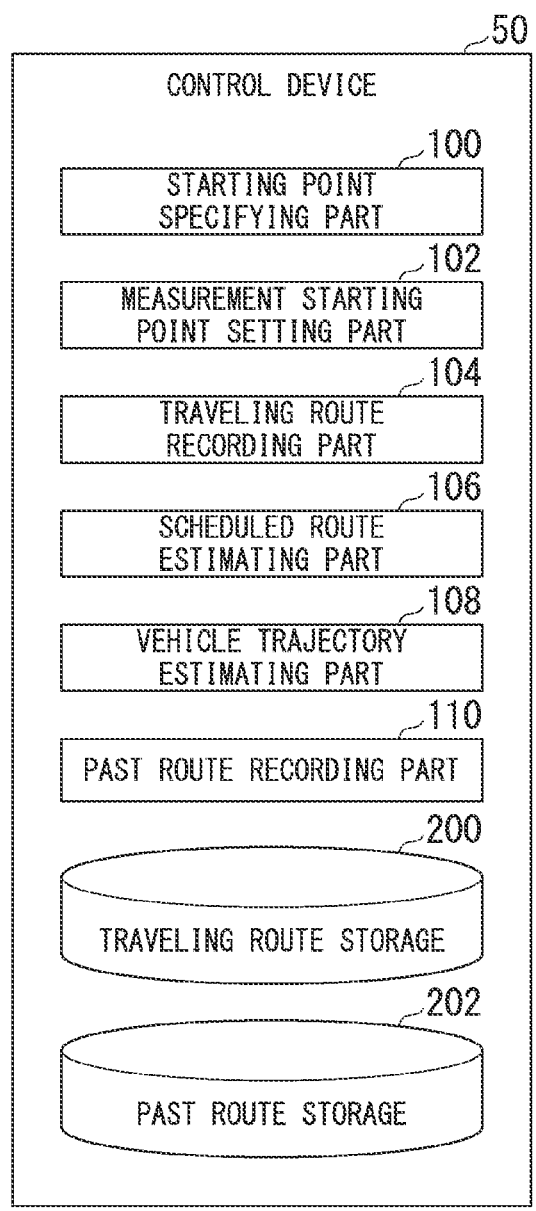
FIG. 2 is a view showing an example of a configuration of a control device according to the first embodiment.

FIG. 2 is a view showing an example of a configuration of the control device 50 according to the first embodiment.

The control device 50 includes a starting point specifying part 100, a measurement starting point setting part 102, a traveling route recording part 104, a scheduled route estimating part 106, a vehicle trajectory estimating part 108, a past route recording part 110, a traveling route storage 200, and a past route storage 202. These components are realized by executing a program (software) using a hardware processor such as a central processing unit (CPU) or the like. In addition, some or all of these components may be realized by hardware (a circuit part; including circuitry) such as large scale integration (LSI), an application specific integrated circuit (ASIC), a field-programmable gate array (FPGA), a graphics processing unit (GPU), or the like, or may be realized by cooperation of software and hardware.

The starting point specifying part 100 specifies a starting point of the vehicle M by acquiring positional information from the positional information acquisition part 80. The measurement starting point setting part 102 sets a measurement starting point of a turning amount of the vehicle M by acquiring positional information from the positional information acquisition part 80. The traveling route recording part 104 records a measurement starting point specified by the measurement starting point setting part 102 and a turning amount acquired from the turning amount acquisition part 90 in the traveling route storage 200.

The scheduled route estimating part 106 estimates a scheduled traveling route of the vehicle M on the basis of a starting point and a turning amount stored in the traveling route storage 200 and the past route storage 202. The vehicle trajectory estimating part 108 estimates a trajectory of the vehicle M on a two-dimensional plane on the basis of the positional information acquired from the positional information acquisition part 80.

Figure 3A:
FIG. 3A is a view showing an example of a traveling route recorded in a traveling route storage.
Figure 3B:
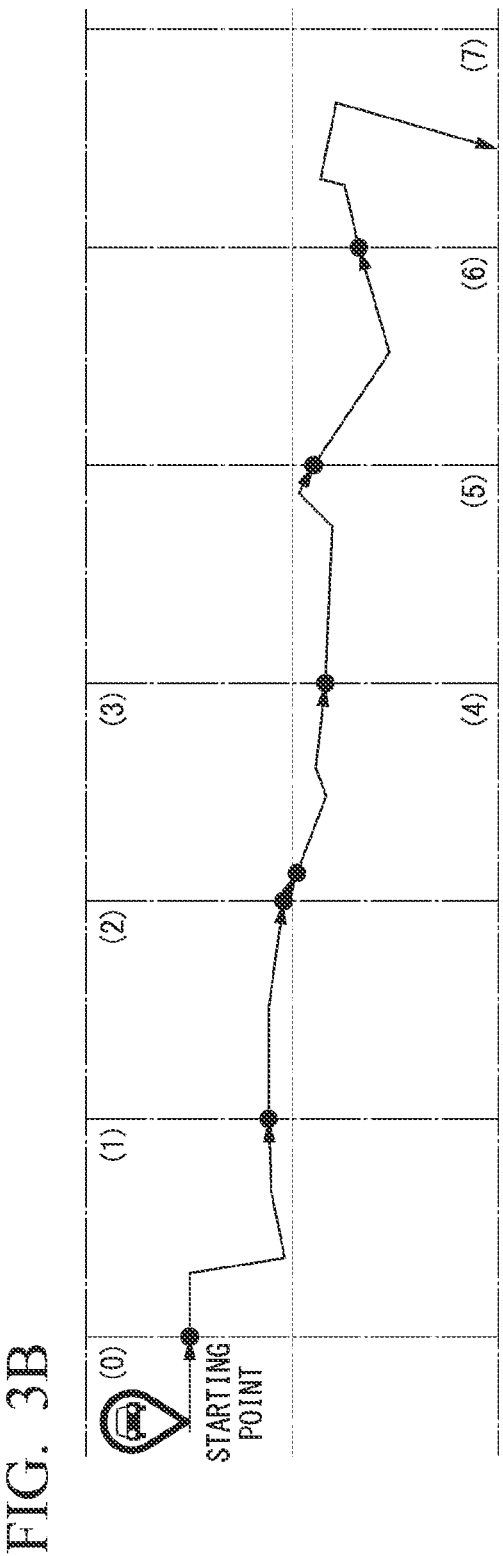
FIG. 3B is a view schematically expressing a traveling route recorded in the traveling route storage.

FIG. 3A is a view showing an example of a traveling route recorded in the traveling route storage 200. FIG. 3B is a view schematically expressing a traveling route recorded in the traveling route storage 200. As shown in FIG. 3B, the two-dimensional plane showing the positional information is divided by sections (hereinafter, this section is referred to as a mesh). For example, the mesh is divided with reference to longitude and latitude. The measurement starting point setting part 102 sets a point at which the trajectory and the boundary line intersect as a measurement starting point when it is determined that the trajectory of the vehicle M estimated by the vehicle trajectory estimating part 108 crosses the boundary line between the meshes.

In the route shown in FIG. 3A, the mesh number corresponds to the mesh number shown in FIG. 3B.

The measurement starting point indicates a measurement starting point in each mesh. A rightward turning amount and a leftward turning amount indicate a rightward turning amount and a leftward turning amount of the vehicle in each mesh.

The past route recording part 110 records the traveling route stored in the traveling route storage 200 after the traveling has ended in the past route storage 202 as a past route. The traveling route storage 200 stores a route during traveling. The past route storage 202 stores the past route. In addition, the past route recording part 110 deletes the earliest recorded route among the past routes stored in the past route storage 202 when the traveling route is recorded in the past route storage 202. For example, when the past route storage 202 stores 100 past routes, the newest 100 past routes can be stored. Accordingly, routes that have been used in the past but are not currently used can be deleted from the past route storage 202, and a capacity can be saved.

In the past route storage 202, the past route may be recorded in association with the number of traveling times of such past route. In this case, when a route that matches the traveling route is present in the past routes stored in the past route storage 202, the past route recording part 110 adds one to the number of traveling times of the past route (hereinafter, referred to as "update"). In addition, when there is no route that matches the traveling route among the past routes stored in the past route storage 202, the past route recording part 110 records the traveling route in the past route storage 202 as a new past route. Here, the past route recording part 110 deletes the most early recorded or updated route. Accordingly, since the same route is not recorded in the past route storage 202 and the route that is not updated is deleted, capacity of the past route storage 202 can be saved.

Figure 4:
FIG. 4 is a view showing an example of a route recorded in a past route storage.

FIG. 4 is a view showing an example of the route recorded in the past route storage 202. The traveling route stored in the traveling route storage 200 is stored in the past route storage 202.

Figure 5:
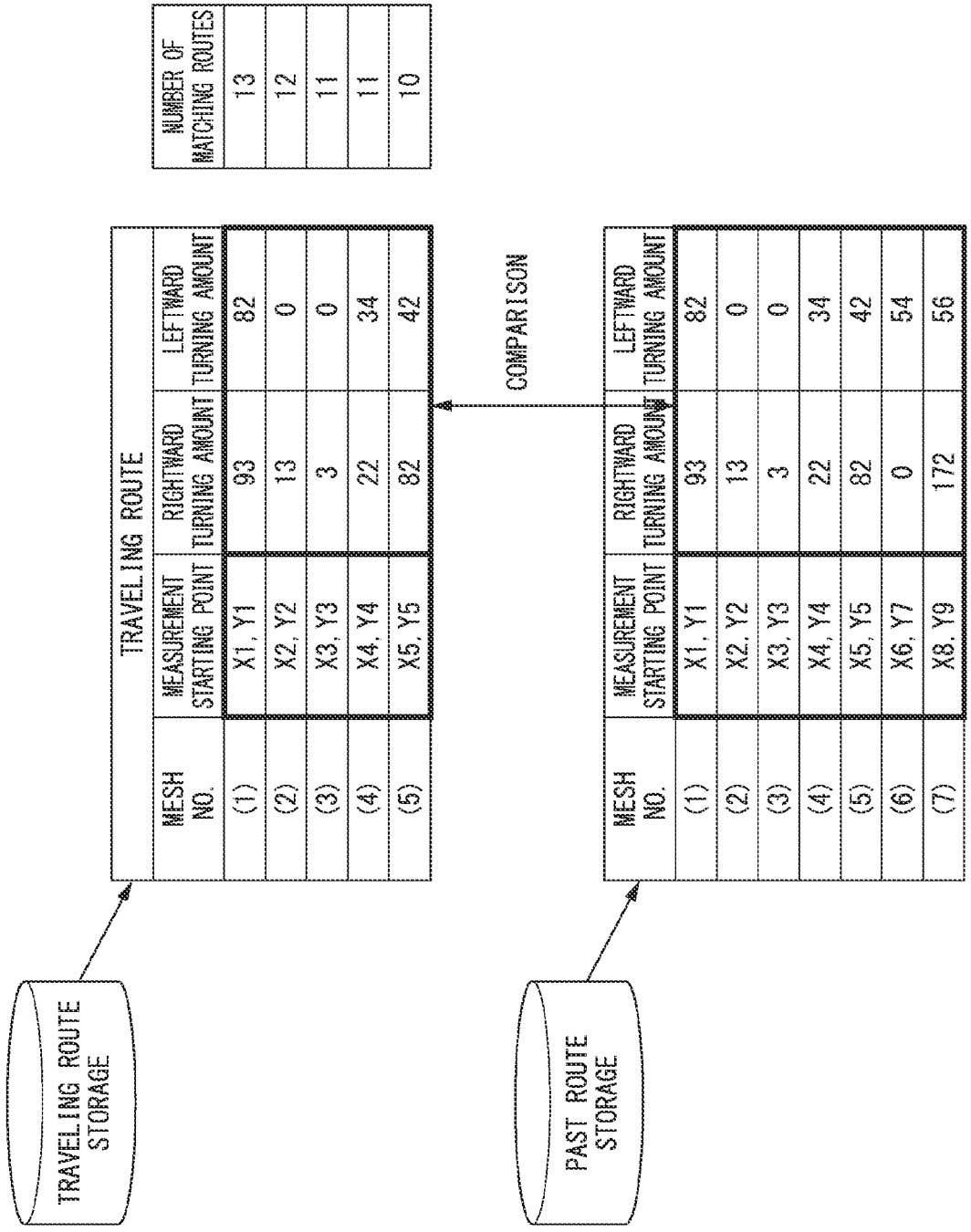
FIG. 5 is a view schematically showing an estimation method of a scheduled route estimating part.

FIG. 5 is a view schematically showing an estimation method of the scheduled route estimating part 106.

The scheduled route estimating part 106 counts how many routes match the traveling route stored in the traveling route storage 200 (matching routes) among the past routes stored in the past route storage 202. The scheduled route estimating part 106 counts how many matching routes there are when the vehicle is traveling and the measurement starting point of the traveling route is set. That is, the number of matching routes decreases as the vehicle travels. For example, in FIG. 5, while the number of matching routes in the mesh number 1 is 13, the number of matching routes in the mesh numbers 1 and 2 is reduced to 12, and the number of matching routes in the mesh numbers 1, 2 and 3 is reduced to 11.

The number of matching routes can be useful in predicting the route the vehicle will travel. For example, the difference in the number of matching routes indicates a frequency that the route is passed. In FIG. 5, according to the past route, the vehicle that travels the route of the mesh number 1 of the traveling route travels the route of the mesh number 2 of the traveling route by 12 times in 13 times.

When the past route is recorded in the past route storage 202 in association with the number of traveling times of the past route, the scheduled route estimating part 106 counts the number of traveling times of the route that matches the traveling route stored in the traveling route storage 200 among the past routes stored in the past route storage 202.

The control device 50 according to the first embodiment can estimate the scheduled route along which the vehicle travels on the basis of the measurement starting point and the turning amount. For this reason, even when no map information is provided, the scheduled route along which the vehicle travels can be estimated.

Second Embodiment

Figure 6:
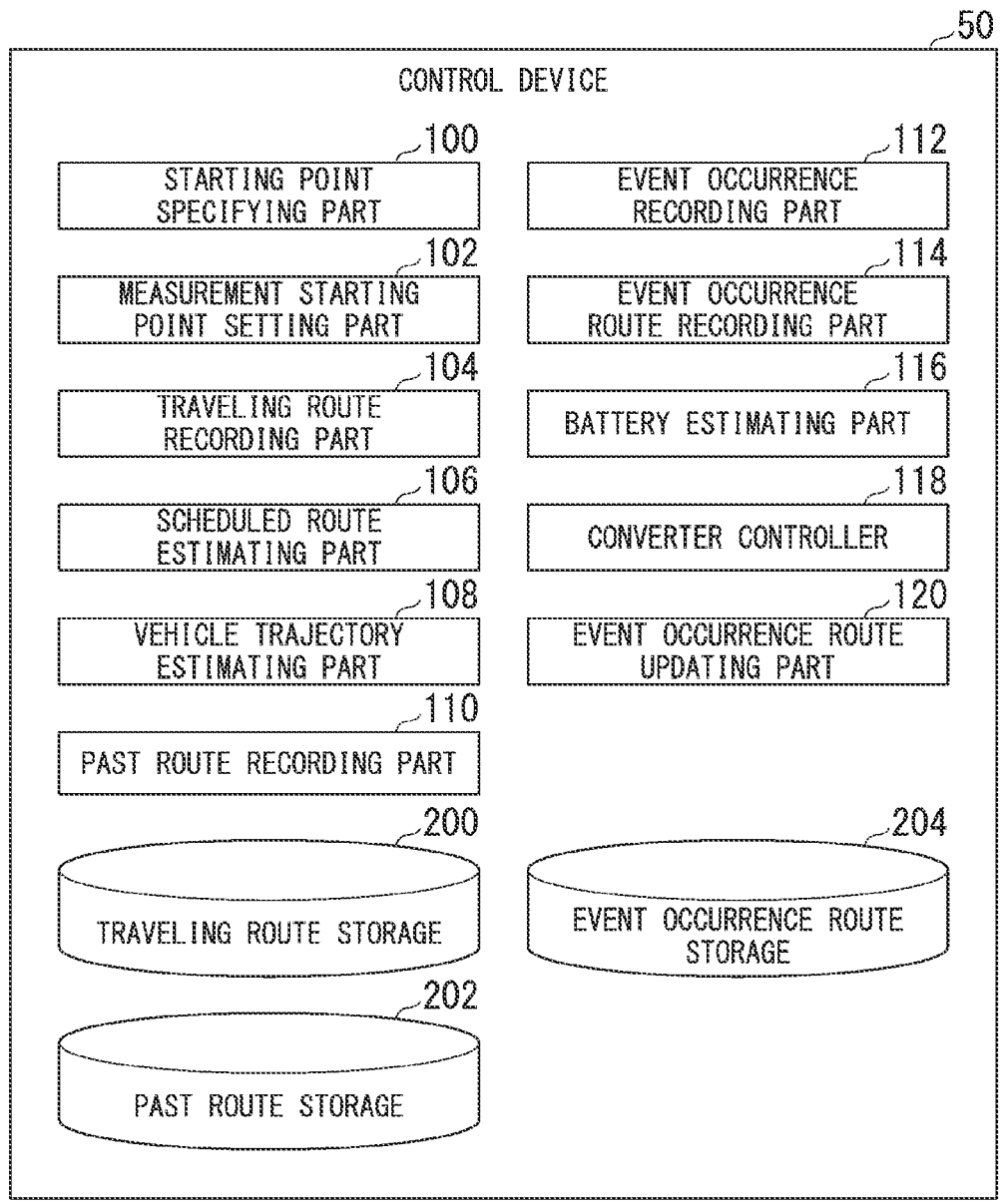
FIG. 6 is a view showing an example of a configuration of a control device according to a second embodiment.

FIG. 6 is a view showing an example of a configuration of a control device 50 according to a second embodiment.

The control device 50 according to the second embodiment includes an event occurrence recording part 112, an event occurrence route recording part 114, a battery estimating part 116, a converter controller 118, an event occurrence route updating part 120, and an event occurrence route storage 204, in addition to the control device 50 according to the first embodiment.

Figure 7A:
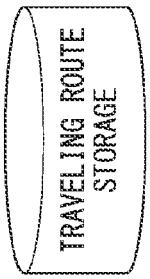
FIG. 7A is a view showing an example of a traveling route recorded in a traveling route storage according to the second embodiment.

The event occurrence recording part 112 records an event occurred during traveling of the vehicle. The event is, for example, an event that the remaining capacity of the battery 60 is above a predetermined reference value, or an event that the vehicle is shifted to an electric power traveling mode which drives the vehicle using the electric power supply from the battery 60 without using the engine 10. FIG. 7A is a view showing an example of a traveling route recorded in the traveling route storage 200 according to the second embodiment. FIG. 7B is a view schematically expressing a traveling route recorded in the traveling route storage 200 according to the second embodiment. FIG. 7A shows that the event has occurred when the measurement starting point is at X8 and Y9, and shows a point where the event has occurred. In FIG. 7B, the point where the event has occurred is shown by x.

The event occurrence route recording part 114 records the route stored in the traveling route storage 200 in the event occurrence route storage 204 when the route stored in the traveling route storage 200 includes event occurrence.

Figure 8:
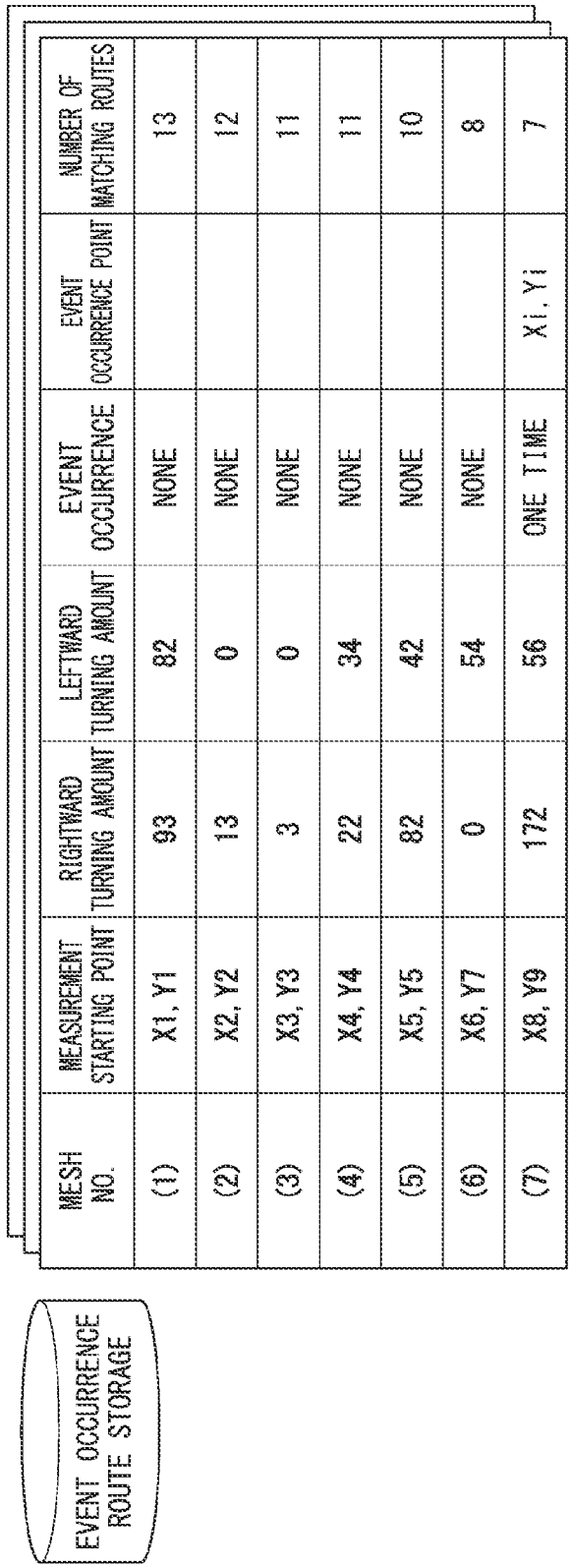
FIG. 8 is an example of an event occurrence route stored in an event occurrence route storage.

FIG. 8 is an example of an event occurrence route stored in the event occurrence route storage 204. The event occurrence route includes at least one event occurrence. In addition, the number of events occurred at the event occurrence point is recorded in the event occurrence route. The number of matching routes is recorded in the event occurrence route. The recorded number of matching routes will be described below.

The battery estimating part 116 estimates a charging rate of the battery 60 on the basis of the data acquired from the battery sensor 62. The converter controller 118 controls switching of the first converter 32, the second converter 34 and the VCU 40.

Figure 9:
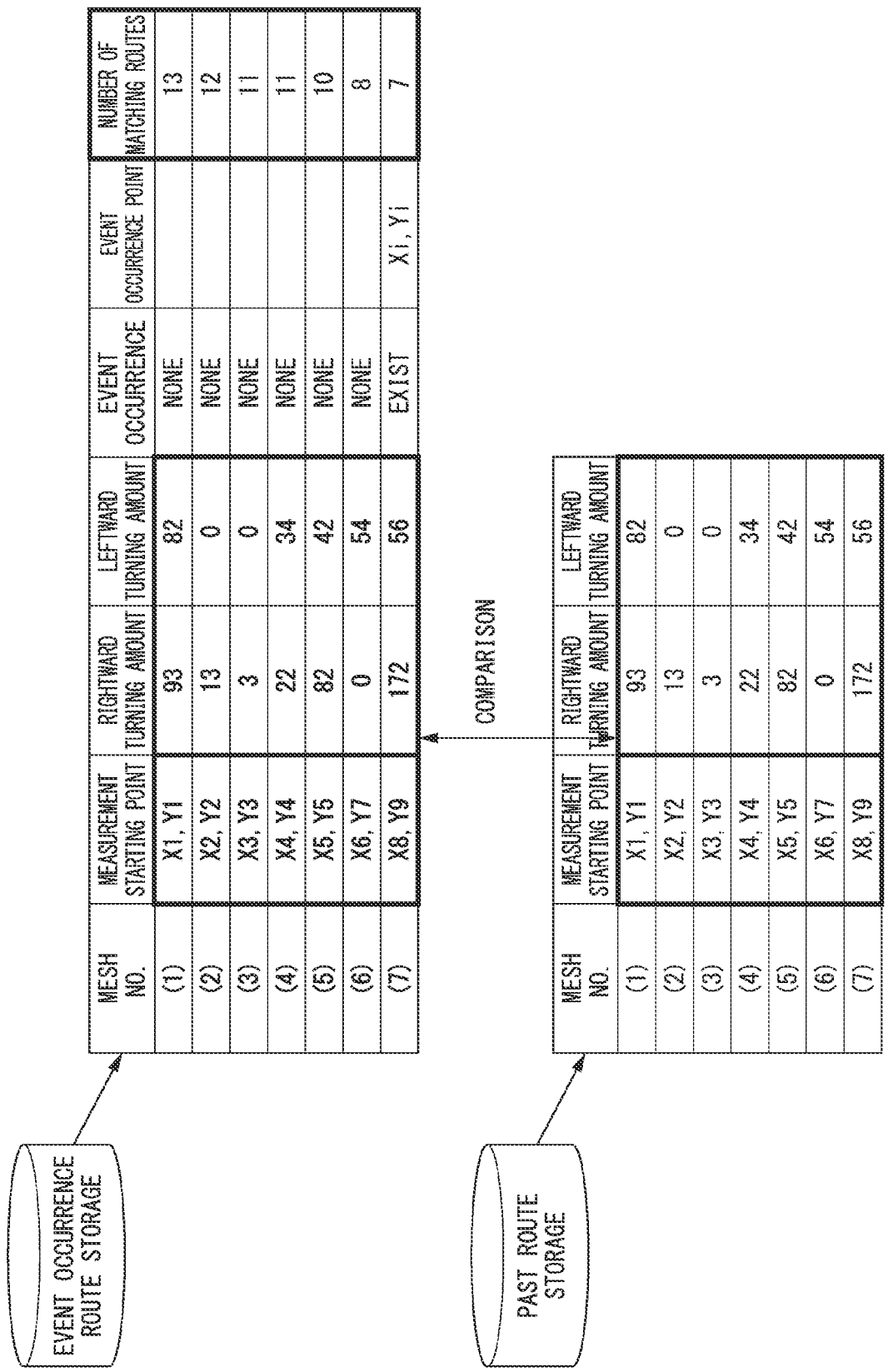
FIG. 9 is a view schematically showing an updating method of an event occurrence route updating part.

FIG. 9 is a view schematically showing an updating method of the event occurrence route updating part 120. The event occurrence route updating part 120 counts how many routes that matches the routes stored in the past route storage 202 (matching routes) for one event occurrence route stored in the event occurrence route storage 204. That is, an operation performed with respect to one route stored in the event occurrence route storage 204 by the event occurrence route updating part 120 is the same operation performed with respect to the traveling route by the scheduled route estimating part 106 in the first embodiment. The event occurrence route updating part 120 records the number of counted matching routes in the corresponding event occurrence route. The event occurrence route updating part 120 records the number of counted matching routes in all the event occurrence routes in the same manner. The above-mentioned operation is referred to as updating of the event occurrence route storage 204.

When the past route is recorded in the past route storage 202 in association with the number of traveling times of the past route, the event occurrence route updating part 120 counts the number of traveling times of the route that matches the route stored in the past route storage 202 for one event occurrence route stored in the event occurrence route storage 204.

The event occurrence route updating part 120 updates the event occurrence route storage 204 periodically. For example, the event occurrence route updating part 120 updates the event occurrence route storage 204 when a predetermined number of past routes are newly stored in the past route storage 202.

The event occurrence route updating part 120 deletes the route, the number of matching routes of which is 0, from the event occurrence route storage 204. Accordingly, the event occurrence route updating part 120 deletes the route that is not included in the past route storage 202, i.e., that is not used, from the event occurrence route storage 204. Accordingly, a load can be reduced in comparison with the traveling route, which will be described, and a memory of the event occurrence route storage 204 can be saved.

Figure 10:
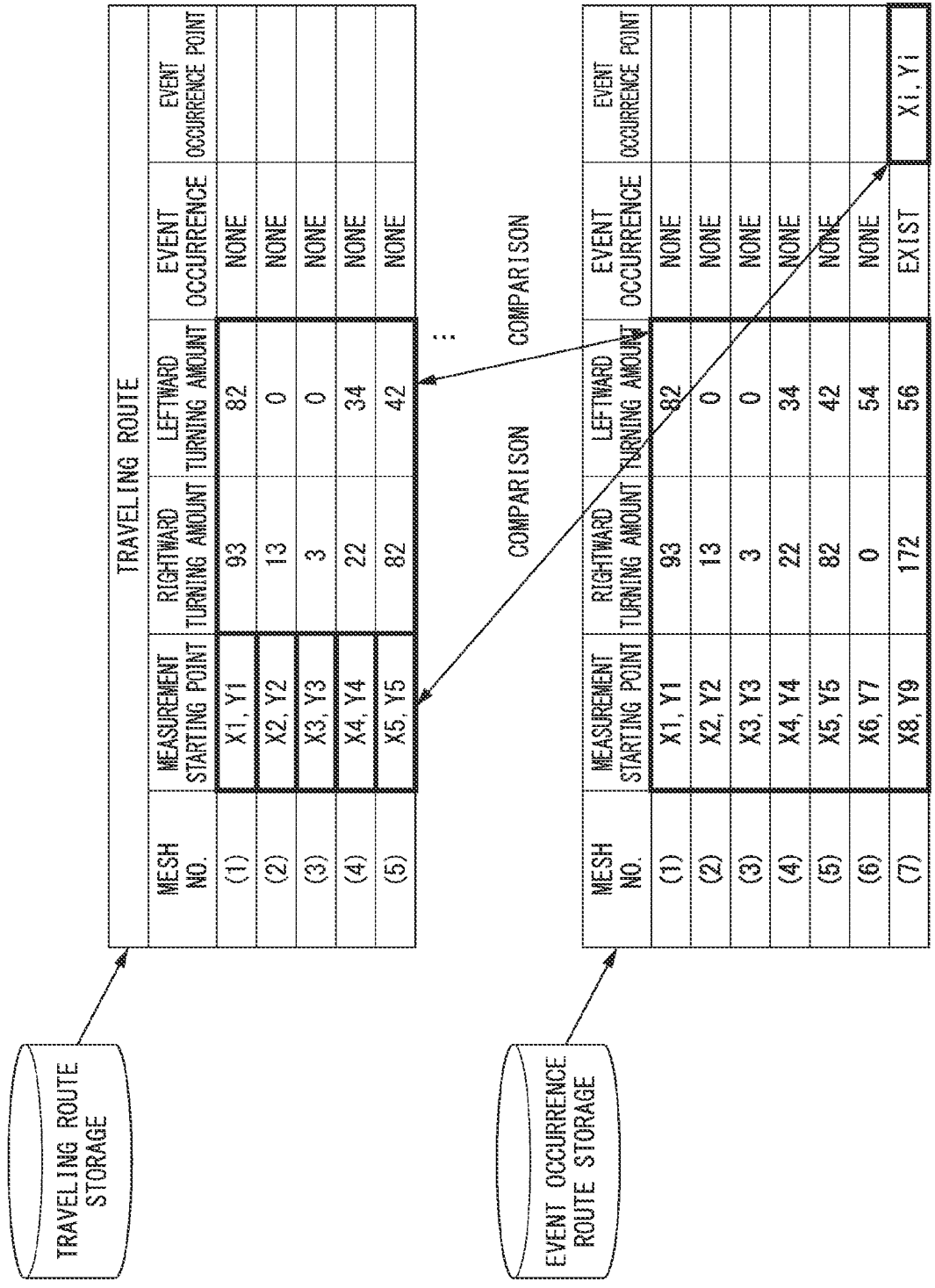
FIG. 10 is a view schematically showing an operation of a scheduled route estimating part according to the second embodiment.

FIG. 10 is a view schematically showing an operation of the scheduled route estimating part 106 according to the second embodiment.

Figure 11:
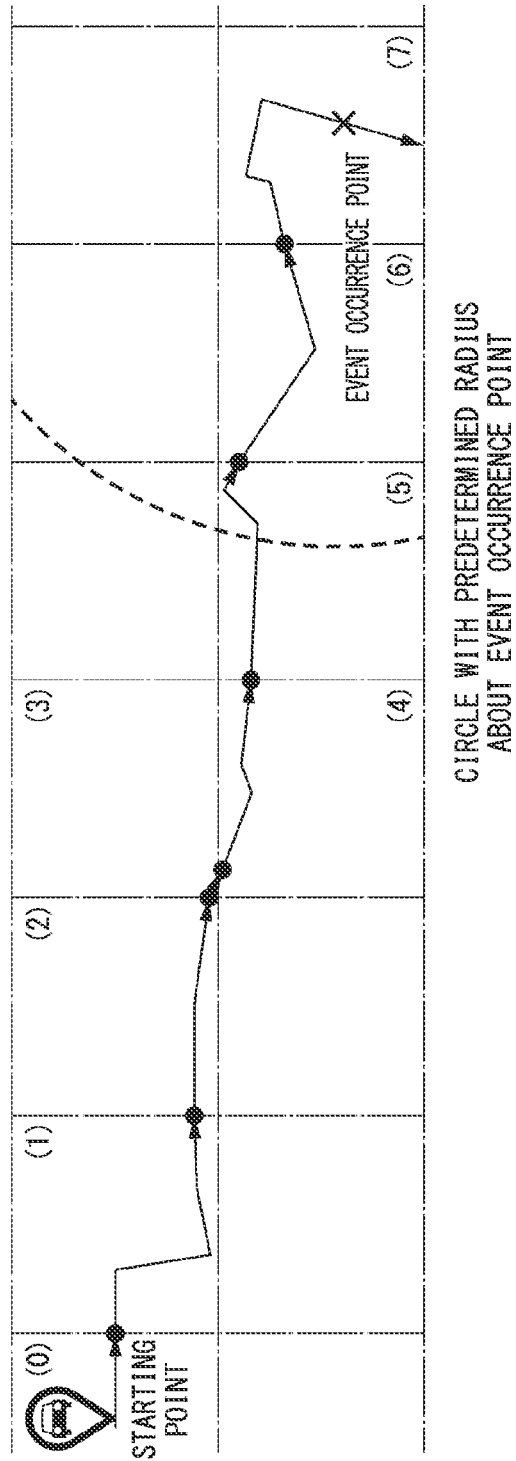
FIG. 11 is a view schematically expressing a traveling route.

The scheduled route estimating part 106 according to the second embodiment uses an event occurrence route, unlike the scheduled route estimating part 106 according to the first embodiment. The measurement starting point of the traveling route is compared with the event occurrence point of the event occurrence route. The scheduled route estimating part 106 compares the measurement starting point and the turning amount of the traveling route with the measurement starting point and the turning amount of the event occurrence route including the event occurrence when the distance between the measurement starting point of the traveling route and the event occurrence point of the event occurrence route is within the predetermined distance. Here, in the drawing schematically expressing the traveling route shown in FIG. 11, a measurement starting point can be included in a circle with a predetermined radius about the event occurrence point.

In the scheduled route estimating part 106, when the measurement starting point and the turning amount of the traveling route matches the measurement starting point and the turning amount of the event occurrence route including the event occurrence, the converter controller 118 controls switching of the first converter 32, the second converter 34 and the VCU 40. For example, when the event is a case in which the remaining capacity of the battery 60 exceeds a predetermined reference value, the converter controller 118 controls switching of the first converter 32, the second converter 34 and the VCU 40 such that power of the battery 60 is wasted. Here, the power wasting is referred to as prevention of excessive charging of the battery 60 by conversion of electric power into heat or kinetic energy or the like other than driving energy of the vehicle and consumption thereof.

The power wasting may be performed by, for example, driving the engine 10 with regenerative energy, or may be performed by another method. When the event is the case in which the vehicle is shifted to an electric power traveling mode which drives the vehicle using electric power supply from the battery 60 without using the engine 10, switching of the first converter 32, the second converter 34 and the VCU 40 is controlled such that the battery 60 is charged.

The control device 50 according to the second embodiment can estimate a scheduled route along which the vehicle travels and events that occurs on the basis of the measurement starting point and the turning amount. For this reason, the control device 50 can estimate the scheduled route along which the vehicle travels and events that occurs even when no map information is provided.

Another Embodiment

The traveling route may include an average speed or a traveling distance in each mesh.

In the route of each mesh, when the distance is a predetermined value or less, the traveling route recording part 104 may not record the route in the traveling route storage 200. In addition, when the distance of the traveling route is a predetermined value or less, the past route recording part 110 may not record the traveling route in the past route storage 202 as the past route.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A control device for a vehicle provided on a vehicle which includes a positional information acquisition part configured to acquire positional information of the vehicle and a turning amount acquisition part configured to acquire a turning amount of the vehicle, the control device for a vehicle comprising:
   a starting point specifying part configured to specify a departure place of the vehicle on the basis of the positional information;
   a measurement starting point setting part configured to set a measurement starting point of a turning amount of the vehicle on the basis of the positional information;
   a traveling route recording part configured to record the measurement starting point and the turning amount of the vehicle for each mesh areas; and
   a scheduled route estimating part configured to count matching numbers between measurement starting points and turning amounts which were recorded in the past and measurement starting points and turning amounts which are obtained during present traveling for each of the mesh areas and to estimate a mesh area which the vehicle passes next based on a change of matching numbers between the mesh areas.

2. The control device for a vehicle according to claim 1, further comprising a vehicle trajectory estimating part configured to estimate a trajectory of the vehicle on a two-dimensional plane on the basis of the positional information acquired from the positional information acquisition part,
   wherein the measurement starting point setting part sets an intersection between a reference line and the trajectory as the measurement starting point when the reference line provided on the two-dimensional plane in a lattice shape intersects the trajectory.

3. The control device for a vehicle according to claim 1, wherein the turning amount acquisition part acquires the turning amount by dividing the turning amount into a rightward turning amount and a leftward turning amount.

4. The control device for a vehicle according to claim 1, wherein the vehicle comprises:
   an engine;
   a battery; and
   an electric motor connected to a driving wheel, driven by electric power supplied from the battery, and configured to supply regenerative electric power generated upon regeneration to the battery,
   wherein an event occurrence recording part configured to record a position of the vehicle when an event related to the battery has occurred is provided.

5. The control device for a vehicle according to claim 4, wherein the event includes an event that a remaining capacity of the battery exceeds a predetermined value.

6. The control device for a vehicle according to claim 4, wherein the event includes an event that the vehicle is shifted to an electric power traveling mode which drives the vehicle by electric power supply from the battery without using the engine.

* * * * *